United States Patent Office 2,907,414
Patented Oct. 6, 1959

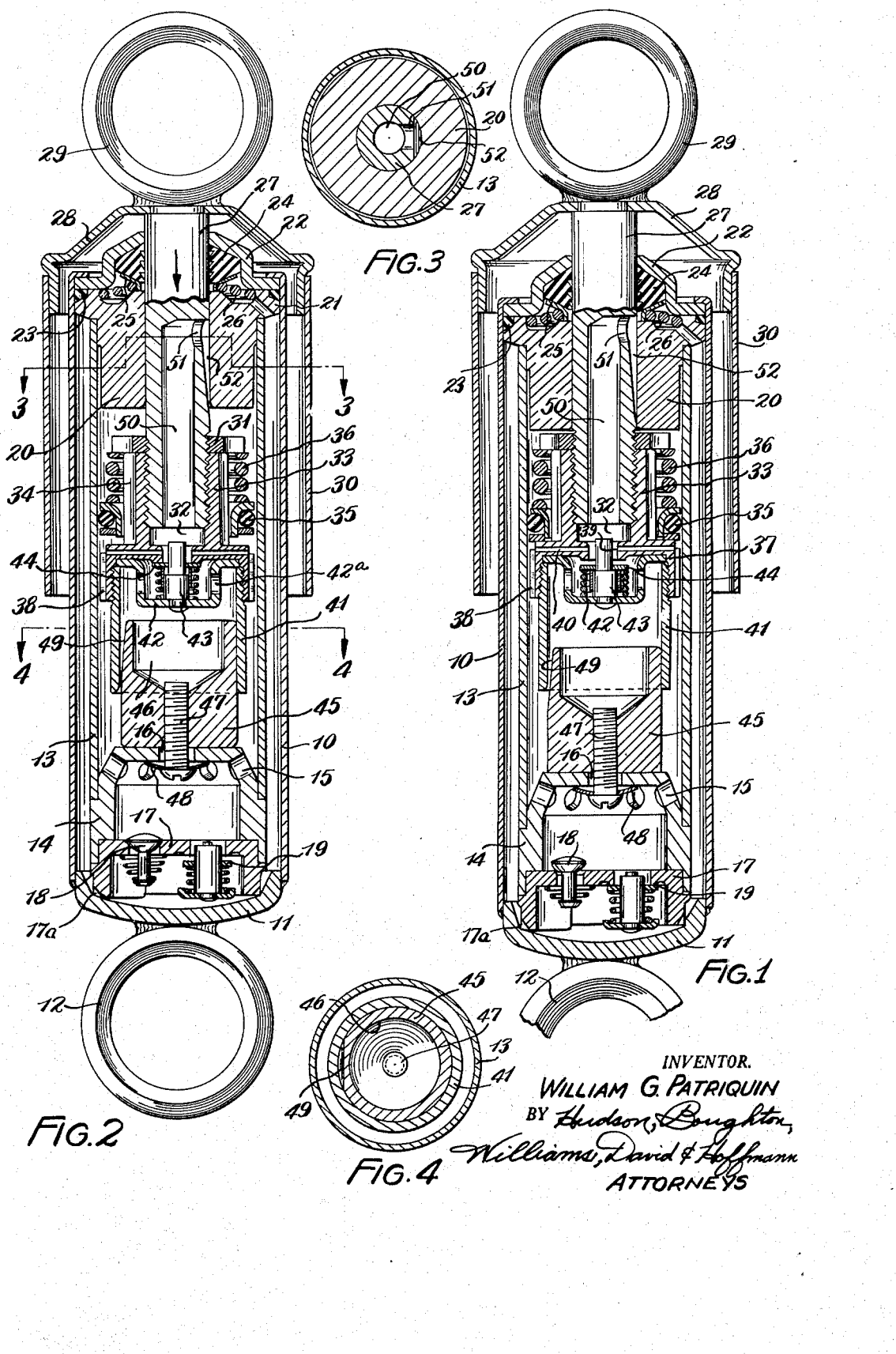

2,907,414

SHOCK ABSORBER WITH HYDRAULIC COMPRESSION STOPS

William G. Patriquin, Willoughby, Ohio, assignor to The Gabriel Company, Cleveland, Ohio, a corporation of Ohio Application June 6, 1956, Serial No. 589,656

4 Claims. (Cl. 188—88)

This invention relates to a direct double acting hydraulic shock absorber and, more particularly, to a shock absorber of this type which includes hydraulic stop means. Although shock absorbers embodying the invention are susceptible of various uses in different environments, for purposes of illustration the shock absorber embodying the invention will be described herein as of a type particularly adapted for use on motor vehicles.

This application is a continuation-in-part of my application Serial No. 475,796, filed December 16, 1954, and now Patent No. 2,783,859, insofar as certain subject matter common to said application and the instant application is concerned.

An object of the invention is to provide in a direct double acting hydraulic shock absorber an improved and novel hydraulic compression stop mechanism effective to produce during the compression or impact stroke of the piston of the shock absorber gradually increasing hydraulic resistance to the movement of the piston.

Another object is to provide in a direct hydraulic shock absorber an improved and novel hydraulic compression stop mechanism so constructed that the cooperating parts of said mechanism are self-aligning with each other so as to compensate for any misalignment which may exist therebetween.

Another object is to provide a direct double acting hydraulic shock absorber which includes the hydraulic stop mechanism previously referred to and also includes hydraulic stop means effective during the rebound or recoil stroke.

Further and additional objects and advantages not hereinbefore referred to will become apparent during the detailed description of an embodiment of the invention which is to follow and which embodiment is illustrated in the accompanying drawing forming part of this specification and wherein, Fig. 1 is a longitudinal section through a shock absorber embodying the invention with the relatively movable parts of the shock absorber in the positions they occupy substantially at the end of the recoil or rebound stroke.

Fig. 2 is a view similar to Fig. 1 but shows the relationship of the parts of the shock absorber as they are during the impact or compression stroke.

Fig. 3 is a transverse sectional view taken substantially on irregular line 3—3 of Fig. 2 looking in the direction of the arrows, and Fig. 4 is a transverse sectional view taken substantially on line 4—4 of Fig. 2 looking in the direction of the arrows.

The direct double acting hydraulic shock absorber shown in the drawings is of the telescopic type and includes an outer cylinder 10 having attached to one end thereof by suitable means, such as by welding, a cap 11 provided with an attaching eye 12, whereby this end of the shock absorber can be attached to the axle of the vehicle by means well known in the art.

An inner cylinder 13 is concentrically disposed in radially spaced relationship within the cylinder 10 and said cylinder 13 constitutes the working or pressure chamber of the shock absorber as will be well understood.

The lower end, as viewed in the drawings, of the inner cylinder 13 is secured to an annular external shoulder formed on an inverted cup-shaped cage 14 forming part of the hydraulic compression stop mechanism. The cage 14 at its upper end, as viewed in the drawings, is inwardly tapered to provide an inclined wall portion in which are a plurality of circularly spaced ports 15 which place the interior of the cage in communication with the interior of the inner cylinder 13.

The upper end of the cage 14 which is the planar wall of the inverted cup-shaped cage is provided with a central opening 16, the purpose of which will later become apparent. The circular wall of the cage 14 adjacent its lower or open end is provided internally with a shoulder that interfits and is secured to a compression head 17 which also is of substantially inverted cup-shaped and is provided in its planar wall with an opening mounting a spring-closed replenishing valve 18 and a second opening controlled by a spring-pressed disk impact valve 19.

The circular wall of the compression head 17 is secured to the interior of the cap 11 while the cap 11 and said circular wall of the compression head are provided with a suitable number of circularly spaced passages 17a which place the space between the cap and the compression head 17 in communication with the reservoir space between the inner cylinder 13 and outer cylinder 10. The arrangement of the compression head with respect to the cap 11 and the arrangement of the replenishing valve 18 and impact valve 19 are well understood in the art and need not be described herein with further detail.

The upper end of the inner cylinder 13, as viewed in the drawing, has mounted therein a closure plug 20 which closes the upper end of the inner cylinder 13 and which plug at its outer end is provided with a radially extending annular flange 21 that interfits the interior of the upper end of the outer cylinder 10. The closure plug 20 is provided with a central opening therethrough in which slidably fits the piston rod of the shock absorber later to be referred to.

A retainer cap 22 has a planar annular flange portion which bears against the outer side of the flange 21 of the plug 20 and against a gasket 23 carried by said flange. The upper end of the outer cylinder 10 is spun over the annular flange of the retainer cap 22 to structurally unite the outer cylinder 10, plug 20 and retainer cap 22.

The retainer cap 22 is provided centrally with an outwardly extending housing portion in which is housed a generally conical gasket or piston rod packing 24, the lower end of which bears upon a washer 25 against which a coil spring 26 exerts its load.

It will be understood that a piston rod 27 of the shock absorber extends centrally through the retainer cap 22 and the piston rod packing 24 and through the central opening in the plug 20 as is common in shock absorbers of this type. The piston rod 27 mounts at its upper end an inverted cup-shaped cap 28 and also has fixedly secured to it on the upper side of the cap 28 an attaching eye 29 whereby the upper end of the shock absorber can be connected to the frame of a motor vehicle as will be well understood in the art. The cap 28 has secured to the outer side of its annular wall a cylindrical depending shield 30 which surrounds the upper portion of the outer cylinder 10 in radially spaced relationship thereto.

The inner or lower end of the piston rod 27 is threaded and has screwed thereon an abutment spider 31 and also the lower end of the piston rod screws into the threaded central bore 32 formed in the portion 33 of the piston and which portion is spaced radially inwardly from the inner wall of the inner cylinder 13 and will be referred to herein as the smaller diameter piston portion.

The smaller diameter piston portion 33 is provided with a series of circularly spaced longitudinally extending peripheral grooves 34. An impact valve assembly indicated at 35 is slidable longitudinally of the piston portion 33 on the circumference thereof and said impact valve assembly includes an O-ring and is of the general construction disclosed in United States patent to Christofel, No. 2,351,662.

The impact valve assembly is engaged by one end of a coil spring 36 which surrounds the piston portion 33 and has its other end engaging the spider 31. The spring 36 normally maintains the impact valve assembly 35 seated against the shoulder formed by the piston portion 37 of larger diameter as shown in Fig. 1. The larger diameter piston portion 37 has a sliding fit in the inner cylinder 13 and is provided on its circumference with a series of circularly spaced longitudinally extending grooves 38 which have their upper ends closed by the valve assembly 35 when the latter is seated as indicated in Fig. 1.

The larger diameter piston portion 37 is substantially of inverted cup-shape and is provided in its planar wall with a central opening 39 communicating with the bore 32 in the smaller diameter piston portion 33. The planar wall, i.e., the bottom wall of the inverted cup-shaped piston portion 37 is provided with radially extending bleed passages 40 which communicate with the central opening 39 and with the upper ends of the grooves 38. The annular wall of the piston portion 37 is interiorly threaded and has screwed therein the upper exteriorly threaded end of a sleeve 41 which will later be referred to and which forms part of the hydraulic compression stop mechanism.

The sleeve 41 is spaced radially inwardly of but concentrically to the cylinder 13 and its upper end engages the annular flange of a cup-shaped retaining member 42 to clamp said member to and interiorly of the larger diameter piston portion 37. The cup-shaped retainer member 42 fixedly mounts centrally thereof a valve post 43 which extends through the opening 39 and into the bore 32 of the piston.

The valve post 43 slidably mounts a disk recoil valve 44 which is spring loaded and normally held in contact with an annular valve seat formed in the piston portion 37 concentrically with the opening 39. The retainer member 42 is provided in its annular wall with a plurality of openings 42a communicating with the interior of the sleeve 41.

The upper end of the cage 14 has secured to it a plug 45 forming part of the hydraulic compression stop mechanism and provided adjacent its upper end with a recess 46. The plug 45 is flexibly secured to the cage 14 by an attaching bolt 47 which screws into a threaded bore in the plug 45 and passes through the central opening 16 in the cage 14 with substantial clearance between the bolt 47 and the wall of said opening 16.

The headed lower end of the bolt 47 engages a dished metal spring 48 interposed between the head of the bolt 47 and the planar wall of the cage 14. It will be seen that the plug 45 while connected to the cage 14 is flexibly connected thereto so as to have limited movement relative to the cage for a purpose soon to be apparent.

The upper end of the plug 45 externally is slightly beveled and said plug 45 extends into the sleeve 41 with a sliding fit. In case the plug 45 and sleeve 41 are slightly misaligned, the beveled upper end of the plug 45 engaging the lower end of the sleeve 41 automatically adjusts the plug 45 into proper aligned relationship with the sleeve 41 so that said sleeve and plug can have correct telescoping relationship.

The plug 45 is provided on its exterior and adjacent its upper end within the sleeve 41 with a milled chordal fault or cutaway 49 which is of gradually variable depth longitudinally of the plug 45 with its greatest depth at the upper end of the plug and its shallowest depth spaced longitudinally from the upper end of the plug toward the lower end of the latter so that the fault provides a passage between the interior of the sleeve 41 and the exterior of the plug 45, the capacity of which will vary in relationship to how far the plug extends into the sleeve. When the plug 45 extends only a short distance into the sleeve 41 as indicated in Fig. 1, then this passage will be of large capacity and conversely when the plug extends substantially farther into the sleeve 41 as indicated in Fig. 2, then this passage will be of greatly reduced capacity and if the plug 45 is within the sleeve 41 a maximum distance the passage will be substantially closed. The purpose of the arrangement just referred to will be pointed out in greater detail.

It will be understood that instead of providing the fault 49 on the exterior of the plug 45 it might be provided on the interior of the sleeve 41. Also it will be understood that in place of a single chordal fault a plurality of faults might be provided, and instead of the fault being chordal in width the plug 45 or the sleeve 41 might be provided with a longitudinal groove or grooves of gradually diminishing depth.

The piston rod 27 is provided with a bore 50 extending longitudinally of the piston rod from its inner end toward its outer end. Also the piston rod 27 has formed therein a radial port 51 which communicates with the bore 50 adjacent the outer end of the latter. The radial port 51 has its outer end communicating with a longitudinally extending chordal fault or cutaway 52 formed on the exterior of the piston rod 27 and of gradually diminishing depth from the port 51 downwardly of the piston rod until it merges with the circumerence of the piston rod.

The fault 52 is located on the piston rod in that portion which extends into the central opening in the plug 20 at the outer end of the inner cylinder 13 and provides a passage between the wall of the central opening and the circumference of the piston rod.

It will be seen that when the parts of the shock absorber are in the relationship shown in Fig. 1 this passage is substantially closed while when the parts are in the relationship shown in Fig. 2 the passage is open and its capacity gradually increases during the downward movement of the piston rod relative to the inner cylinder 13.

It will be understood that the fault 52 might be in the nature of a longitudinally extending groove as distinguished from a chordal fault such as has been shown for illustrative purposes.

The functioning of the parts hereinbefore described and the advantages resulting from the use of said parts will now be brought out in the explanation which is to follow of the operation of the shock absorber.

Assuming that the shock absorber embodying the invention has been assembled with the plug 45 extending into the sleeve 41 and that the working chamber within the cylinder 13 is filled with oil and the reservoir between the inner cylinder 13 and the outer cylinder 10 is partially filled with oil and the attaching eyes 12 and 29 are operatively connected, respectively, to the axle and frame of a vehicle, the shock absorber functions as follows.

In Fig. 1 the parts are shown in the relationship they have near the end of the recoil or rebound stroke during which the cylinder 13 and the piston move relatively with the piston approaching the upper end of the cylinder 13. Now assuming that the shock absorber piston commences its impact stroke from the position shown in Fig. 1 and toward the position shown in Fig. 2, in the direction indicated by the arrow, the replenishing valve 18 closes and as the piston moves downwardly in the cylinder 13 the recoil valve 44 is held seated. During this downward movement of the piston in the cylinder 13 oil can pass from the lower side of the piston through the bleed passages 40 and into the bore 50 in the piston rod and as the downward movement continues this oil can pass through the port 51, fault passage 52 into the upper end of the cylinder 13 in increasing volume as the deeper portions of the fault 52 are uncovered from the plug 20. During the downward movement of the piston on the impact stroke the pressure below the piston increases until the impact valve assembly 35 carried by the piston moves against the load of the spring 36 as indicated in Fig. 2, whereupon the oil is free to flow through the grooves 38 to each side of the piston. As more and more of the piston rod 27 enters the cylinder it displaces a greater volume of oil and this causes the impact valve 19 to open so the displaced oil can flow from the interior of the cylinder 13 to the reservoir. During the first part of the impact stroke of the piston the upper end of the plug 45 is located near the lower end of the sleeve 41 so that the passage between the inner circumference of the sleeve and the exterior of the plug provided by the fault 49 is at substantial maximum capacity, wherefore the oil within the sleeve and within the recess 46 can flow rather freely through the passage. As the piston continues its impact stroke the capacity of this passage is gradually diminished until the passage is substantially closed, whereupon the oil within the diminished space between the sleeve 41 and the recess 46 is substantially trapped and functions as an hydraulic compression stop resisting further impact movement of the piston.

Now assuming that the piston starts its recoil or upward stroke. The impact valve 19 closes as does also the impact valve assembly 35 carried by the piston. The oil above the piston in gradually diminishing volume can flow through the passage provided by the fault 52, through the port 51 and into the bore 50 in the piston rod with a certain quantity of the oil bleeding to the lower side of the piston through the passages 40. Also during the recoil stroke the replenishing valve 18 opens so that oil flows from the reservoir into the cylinder 13 to compensate for the volume of the piston rod leaving the cylinder. During the recoil stroke the pressure of the oil in the bore 50 in the piston rod and in the cylinder 13 above the piston will overcome the spring load on valve 44, unseating said valve so that oil can flow into the sleeve 41 and thence through the passage between said sleeve and the plug 45 to the lower side of the piston. If the area in the working chamber above the piston is greater than the area within the sleeve 41, plug 45 and the piston at the time the vehicle springs start to expand and the piston starts the recoil stroke, the recoil valve 44 opens and the oil passing through the piston fills the interior of the telescoped sleeve and plug to overflowing and cannot escape since the bleed passage between the sleeve and plug is at this time of minimum capacity. Consequently the flow of oil through the piston is retarded, and hence a rebound resistance or delay at the initial portion of the rebound stroke is provided. This rebound resistance gradually decreases as the bleed passage between the sleeve 41 and plug 45 increases in capacity during the rebound stroke. Of course during the rebound or recoil stroke the passage provided by the fault 52 is gradually diminished in capacity until it is substantially closed. Consequently at such time the oil above the piston is trapped and an hydraulic stop is provided to the upward movement of the piston near the end of its recoil stroke.

It will be seen that in the latter portions of both the impact and recoil strokes of the piston hydraulic stop actions to the piston movement are built up gradually and smoothly until a maximum stop action is obtained, thus preventing bottoming of the plug in the piston and of the sleeve 41 on the cage 14 and also bottoming of the spider 31 on the plug 20.

Inasmuch as the plug 45 is flexibly connected to the cage 14 limited misalignment of the plug 45 relative to the sleeve 41 will be corrected since the plug 45, due to its flexible connection to the cage is self-centering.

Although a preferred embodiment of the invention has been illustrated and described herein, it will be understood that the invention is susceptible of various modifications and adaptations within the scope of the appended claims.

Having thus described my invention, I claim:

1. A direct double acting hydraulic shock absorber having a cylindrical working chamber closed at one end and provided with a compression head at its other end and communicating with a reservoir through a compression passage and a replenishing passage in said head and in which working chamber is a reciprocating piston connected on its side that is adjacent to said closed one end of said chamber to a piston rod extending outwardly of the chamber through said closed one end thereof, said piston being provided with separate valve controlled passages for the oil to flow past the piston during the compression or impact piston stroke and during the recoil or rebound piston stroke, a hydraulic compression stop mechanism comprising two stop elements having sliding telescopic relationship, one of said elements being connected to the piston, interconnected fastener means flexibly connecting the other of said elements with said compression head so as to be capable of limited bodily radial displacement in all directions and thus self-centering with respect to said one element, said elements being provided with bleed means variable in capacity during the telescoping movement of said elements as the piston moves in said working chamber, said interconnected fastener means flexibly interconnecting the other of said elements with said compression head including a cage secured to said compression head and means carried by said cage and connecting the other of said elements thereto for limited movement relative to said cage and radially of said working chamber, said last named means including an opening formed in said cage, a bolt extending through said opening with a clearance therearound and connected to the other of said elements and provided on its end within said cage with a head, and a spring interposed between said head of said bolt and said cage.

2. A direct double acting hydraulic shock absorber as defined in claim 1 and wherein said one element is a sleeve carried by said piston while said other element is a cylindrical plug provided in its end that telescopes in said sleeve with a recess.

3. A direct double acting hydraulic shock absorber having a cylindrical working chamber closed at one end and provided with a compression head at its other end and communicating with a reservoir through a compression passage in said head and in which working chamber is a reciprocating piston connected on its side that is adjacent the said closed one end of said chamber to a piston rod extending outwardly of the chamber through said closed one end thereof, said piston being provided with separate valve controlled passages for the oil to flow past the piston during the compression or impact piston stroke and during the recoil or rebound piston stroke, a hydraulic compression stop mechanism comprising a sleeve member carried by said piston and a plug member connected with said compression head and slidably telescoping within said sleeve member, interconnected fastener means connecting said plug member to said compression head so as to be self-centering with respect to said sleeve member, passage means between said members and variable in capacity during movement of said plug member in said sleeve member and formed by a longitudinally extending cutout portion on one of said members, said interconnected fastener means including an inverted cup-shaped cage secured to said compression head and extending into said working chamber and provided centrally of its planar end with an opening, a bolt extending through said opening with a clearance therearound and connected to said plug member, said bolt being provided on its end within said cage with a head, and spring means interposed between the head of said bolt and the planar end of said cage.

4. A direct double acting hydraulic shock absorber having a cylindrical working chamber closed at one end and provided with a compression head at its other end and communicating with a reservoir through a compression passage and a replenishing passage in said head and in which working chamber is a reciprocating piston connected on its side that is adjacent to said closed one end of said chamber to a piston rod extending outwardly of the chamber and slidable in said closed one end thereof, said piston being provided with separate valve controlled passages for the oil to flow past the piston during the compression or impact piston stroke and during the recoil or rebound piston stroke, said piston rod being provided with a longitudinal bore forming part of the valve controlled passage for the oil during the recoil or rebound piston stroke, said piston rod being provided with a port communicating with the upper end of said bore and with an external bleed means formed on said piston rod and cooperating with said closed one end of said chamber to provide a passage extending from said port to the upper end of said chamber and varying in capacity during the telescoping movement of the piston and rod, and a hydraulic compression stop mechanism comprising two stop elements having sliding telescopic relationship, one of said elements being connected to the piston and communicating with the valve controlled passage for the oil to flow past the piston during the recoil or rebound piston stroke, the other of said elements being connected with said compression head, interconnected fastener means connecting the other of said elements with said compression head so as to be self-centering with respect to said one element, and said elements being provided with bleed means variable in capacity during the telescoping movement of said elements as the piston moves in said working chamber.

References Cited in the file of this patent

UNITED STATES PATENTS

| | | |
|---|---|---|
| 2,027,966 | Dubonnet | Jan. 14, 1936 |
| 2,440,353 | Wallace | Apr. 27, 1948 |
| 2,702,099 | Lautz | Feb. 15, 1955 |
| 2,760,604 | Wyeth | Aug. 28, 1956 |
| 2,783,859 | Patriquin | Mar. 5, 1957 |

FOREIGN PATENTS

| | | |
|---|---|---|
| 158,802 | Australia | Sept. 14, 1954 |